United States Patent
Higgins et al.

[11] Patent Number: 5,923,643
[45] Date of Patent: *Jul. 13, 1999

[54] REDUNDANCY, EXPANDED SWITCHING CAPACITY AND FAULT ISOLATION ARRANGEMENTS FOR EXPANDABLE TELECOMMUNICATIONS SYSTEM

[75] Inventors: Peter Higgins, Sandwich; Mark P. Hebert, Kingston; John T. Lynch, East Sandwich, all of Mass.

[73] Assignee: Excel, Inc., Hyannis, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,493

[22] Filed: Feb. 27, 1997

[51] Int. Cl.[6] .................................................. H04L 12/437
[52] U.S. Cl. ........................ 370/218; 370/224; 370/404; 370/409; 340/827; 340/825.05; 379/273; 379/279; 395/182.02; 395/200.69
[58] Field of Search ..................................... 370/352, 375, 370/224, 221–223, 217, 218, 242, 244, 249, 250, 400, 401, 402, 403, 404, 405, 409; 340/825.03, 826, 827, 825.05; 379/271, 272, 273, 279; 395/181, 182.01, 182.02, 200.68, 200.69, 200.73

[56] References Cited

U.S. PATENT DOCUMENTS

| | | |
|---|---|---|
| 5,159,595 | 10/1992 | Flanagan et al. ........................ 370/224 |
| 5,307,353 | 4/1994 | Yamashita et al. ................ 395/182.02 |
| 5,544,163 | 8/1996 | Madonna ................................ 370/352 |

OTHER PUBLICATIONS

IEEE Std. 802.5c—1991, 802.5 Supplement, "Local and Metropolitan Area Networks".

*Primary Examiner*—Alpus H. Hsu

[57] ABSTRACT

Redundancy, expanded switching capacity and fault isolation arrangements for use with an expandable telecommunications system. An inter-nodal network connects a plurality of programmable switching nodes or other nodes. One or more additional inter-nodal networks may be provided across some or all of the ones. The bandwidth provided by the additional network(s) may be used to provide redundancy against failure of the primary network or the nodes, increased switching capacity or a combination of both. In addition, faults which occur either within a particular node or within an inter-nodal network may be effectively isolated and prevented from degrading system performance.

34 Claims, 8 Drawing Sheets

REDUNDANCY, EXPANDED SWITCHING CAPACITY AND FAULT ISOLATION ARRANGEMENTS FOR EXPANDABLE TELECOMMUNICATIONS SYSTEM

CROSS-REFERENCES TO RELATED APPLICATIONS AND PATENTS

The following commonly-owned patents are related to the present invention and are hereby incorporated by reference:

U.S. Pat. No. 5,544,163, entitled "Expandable Telecommunications System," naming as inventor Robert P. Madonna; and U.S. Pat. No. 5,349,579, entitled "Telecommunication Switch With Programmable Communications Services," naming as inventors Robert P. Madonna and Kevin C. Kicklighter.

BACKGROUND OF THE INVENTION

1. Field of the Invention

This present invention relates generally to the field of telecommunications and, more specifically, to arrangements for providing redundancy, expanded switching capacity and fault isolation in an expandable telecommunications system.

2. Discussion of the Related Art

In most telecommunications systems, it is highly desirable, if not necessary, to provide some measure of redundancy with respect to some or all parts of the system. Such redundancy is needed to ensure that the system will continue to operate, preferably with no degradation of performance, in the event that a particular subsystem or component malfunctions or must be taken out of service.

Redundancy may be provided in a number of ways, the choice of which typically depends upon the cost, the importance of a particular device to overall system performance, the degree of difficulty of replacing the device and other factors. One type of redundancy, often referred to as "one-to-one" redundancy, is based on the concept that each "active" device is matched or paired with an identical "standby" device. In the event that the active device fails, a "cutover" occurs in which the standby device functionally replaces the failed device.

A major disadvantage of conventional one-to-one redundancy is that, at the time of cutover, the original active device and the standby device are in non-identical operating states. Any difference between those operating states will generally result in interruption or loss of service, which may be manifested in the form of dropped calls, calls which fail to connect, and the like. Such degraded performance is generally unacceptable to service providers and customers, at least to the extent that it affects more than a very small percentage of the total call traffic for a very short period of time.

One alternative to the one-to-one redundancy approach is to provide a limited number of standby components which are available to replace some, but not all, of a larger number of active components. This approach is often referred to as "n+1" redundancy where n refers to the number of active components. While the n+1 approach is less costly than the one-to-one approach, there is correspondingly less protection against degraded system performance. That is, in the event that several active devices fail at about the same time and that number exceeds the number of available standby devices, then some loss of service or degradation of performance will occur.

Another disadvantage of the n+1 approach is that because it is not known in advance which one of several active devices may fail, there is no way to maintain a particular standby device in an operating state which matches that of the device which is to be replaced. Consequently, in the n+1 redundancy approach, there is a high likelihood that service will be disrupted during cutover from a failed device to a standby device.

SUMMARY OF THE INVENTION

In brief summary, the present invention provides redundancy and fault isolation arrangements for use with an expandable telecommunications system. In a preferred embodiment, the invention is implemented in a system which includes a plurality of programmable switching nodes or other types of nodes, all of which are interconnected by a plurality of fiber optic rings, and a host computer or other device which controls the operations of the system. Each ring is capable of carrying packetized information among all of the nodes which are served by that particular ring. Each node includes at least one nodal switch which functions, in part, as an interface with a single ring. A particular node may include multiple nodal switches to enable it to interface with a corresponding number of rings.

In accordance with one aspect of the invention, a first level of redundancy is provided, with respect to the rings and the nodal switches, by employing a second ring to serve some or all of the nodes of the system. As part of a configuration procedure, each of the nodal switches is assigned a logical identifier which uniquely identifies a given node throughout the entire system. Each node is also configured to operate in either a transmit/receive mode or a receive only mode with respect to each ring that serves the node. By configuring two nodal switches located within the same node, but interfaced to different rings, to operate in transmit/receive mode, all of the pulse code modulated (PCM) information originating from that node will be transmitted on each ring. Thus, in the event that one of the rings fails, all PCM information necessary for inter-nodal connections is available on the remaining ring and the system will continue to operate. A third or any number n of additional rings, along with corresponding nodal switches in the desired nodes, may be added to provide multiple levels of redundancy, if desired. Thus, this overall arrangement may be said to provide "1 to n+1" levels of redundancy.

In addition, the second ring (or any other ring) may be arranged so that it serves some, but not all of the nodes, in the system. Such an arrangement is advantageous for particular applications in which certain nodes are deemed non-essential and are therefore not provided with redundancy. In effect, this arrangement allows the bandwidth of the second (redundant) ring to be allocated among only those nodes whose functions are deemed critical to system performance.

In accordance with another aspect of the invention, the bandwidth provided by the addition of a second or greater number of rings (and corresponding nodal switches) may be used, in whole or in part, to increase the system's switching capacity, as opposed to providing redundancy as just described. In such an arrangement, different groups of nodes are configured to operate in transmit/receive mode with respect to different rings, each node operating in receive only mode with respect to all rings except for the ones on which it transmits. As a result, the switching capacity of the system may be increased as a function of the number of rings used multiplied by the switching capacity of the system when using a single ring. If desired, a portion of the bandwidth of a particular ring may be used for expanded switching capacity, while the remaining portion is used to provide redundancy to selected nodes.

In accordance with yet another aspect of the invention, a fault within a particular node or a portion of a ring may be isolated and prevented from degrading system performance. This is accomplished by providing each nodal switch with a special mode of operation referred to as a loopback mode. In the event of a failure of either a node or a portion of a ring, the loopback mode of operation may be invoked to maintain connections among the remainder of the system.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENTS

Figure 1:
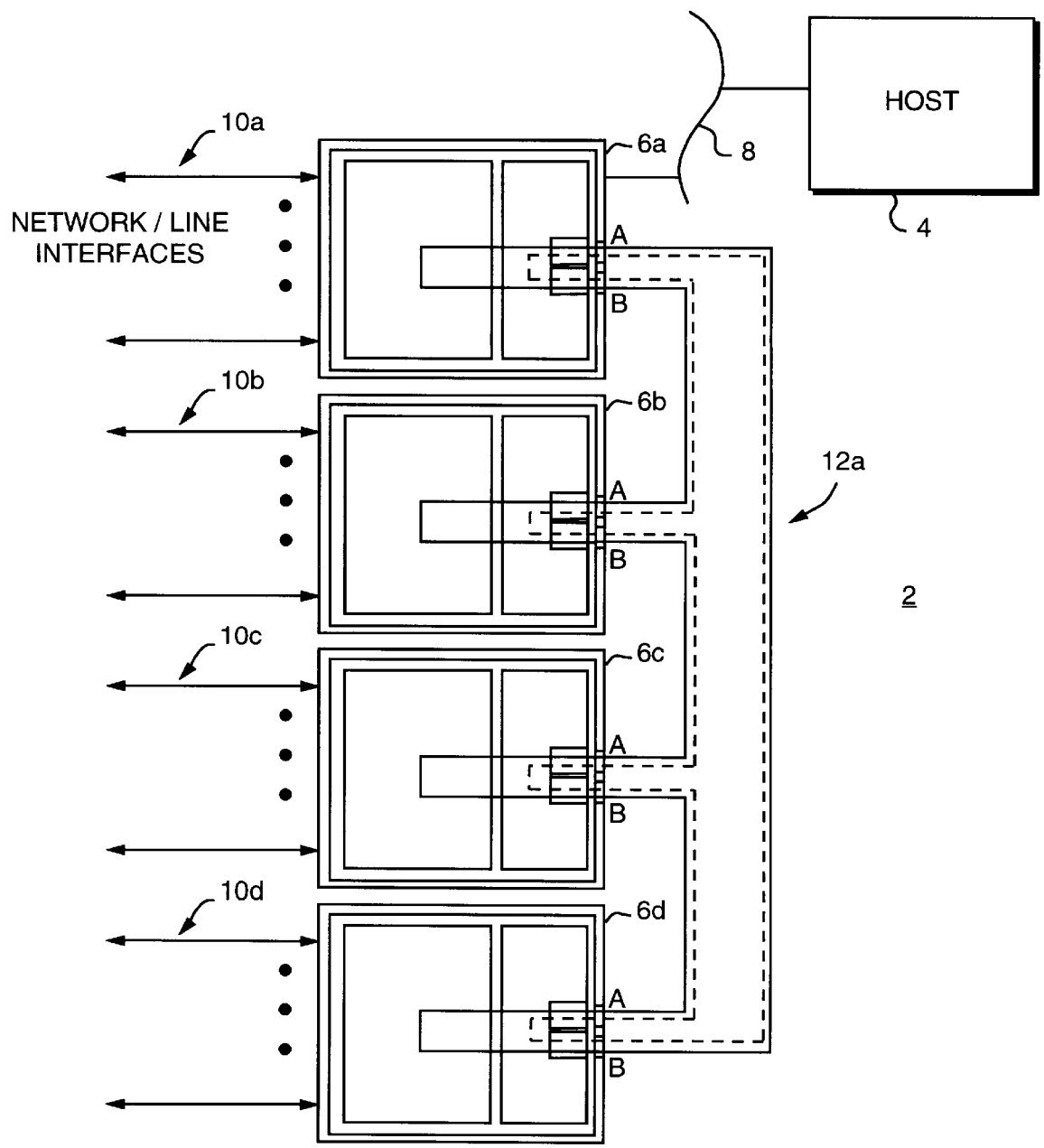
FIG. 1 is a block diagram of an expandable telecommunications system which employs a single ring inter-nodal network to transfer information among programmable switching nodes, all of which is constructed in accordance with a preferred embodiment of the present invention.

FIG. 1 shows a large capacity, expandable, fully programmable telecommunications switching system 2. Details of the construction and operation of system 2 may be found in U.S. Pat. Nos. 5,544,163 and 5,349,579, both of which are assigned to the assignee of the present invention. To aid in understanding the present invention, certain aspects of system 2 are discussed here.

System 2 includes a host 4 and four programmable switching nodes 6a–6d. It should be understood that a larger or smaller number of switching nodes and other types of non-switching (e.g., voice processing or communications services) nodes may be used in essentially any combination in system 2. Node 6a includes a host interface which is connected in communicating relationship with host 4 by a local area network (LAN) such as Ethernet or other communication link 8. In such a configuration, node 6a may receive messages from host 4 which are intended for one of the other nodes and pass such messages to the appropriate node over an inter-nodal network 12a. Other types of host/node interfaces may be used instead of or in addition to the LAN/link 8. In addition, one or more of the remaining nodes 6b–6d may also be directly connected in communicating relationship with host 4 via LAN/link 8 (not shown). In the absence of a direct link from host 4 to each of nodes 6b–6d, such nodes must be connected in communicating relationship with node 6a is such fashion as to allow messages to be transmitted to and received from host 4.

Although only a single host 4 is shown, use of LAN 8 to provide host/node communications permits multiple hosts to control the system 2 (or parts thereof) by configuring each host as a "client" and each node as a "server."

Each of nodes 6a–6d may include connections 10a–10d with the public switched telephone network (PSTN) (not shown) or a private network (not shown). The term "private network" is intended in a broad sense to refer to any network or line or other interface other than the PSTN. Network/line interfaces 10a–10d may terminate either digital networks or analog trunks/lines, or combinations of both types. The network/line interfaces of a given node may include suitable interfaces for performing communications using ATM, Signalling System 7 (SS7), ISDN, T1/robbed bit, E1/CAS or other communication protocols.

Nodes 6a–6d are connected together by inter-nodal network 12a which provides for high speed, high bandwidth digital connections among the nodes. Each of nodes 6a–6d includes two ports, denoted A and B, which are physically interfaced with inter-nodal network 12a. Under normal operating conditions, each of nodes 6a–6d receives packetized information (from other nodes) through port A and transmits packetized information to other nodes through port B.

Inter-nodal network 12a is preferably implemented using one or more fiber optic rings. Inter-nodal network 12a may also be implemented with any of a variety of other types of communications networks, including wide area networks, wireless communications networks and the PSTN (ATM/SONET). Using the PSTN to implement inter-nodal network 12a permits the nodes to be geographically distributed over large areas.

As discussed in detail below, a solid line shown as part of inter-nodal network 12a denotes a communication path which is active during normal operation of system 2. A dashed line shown as part of inter-nodal network 12a denotes a communication path which is inactive during a normal mode of operation, but which may become active following a failure of one of nodes 6a–6d or a portion of inter-nodal network 12.

The overall operation of system 2 is controlled by host 4, which is commonly implemented with a personal computer (PC), workstation, fault tolerant or other computer on which a user's application software runs. Host 4 and each of nodes 6a–6d exchange messages over LAN/link 8. Such messages are typically used to configure the nodes as well as direct call processing functions such as making connections and providing communications services (i.e., tone detection, tone generation and conferencing).

Figure 2:
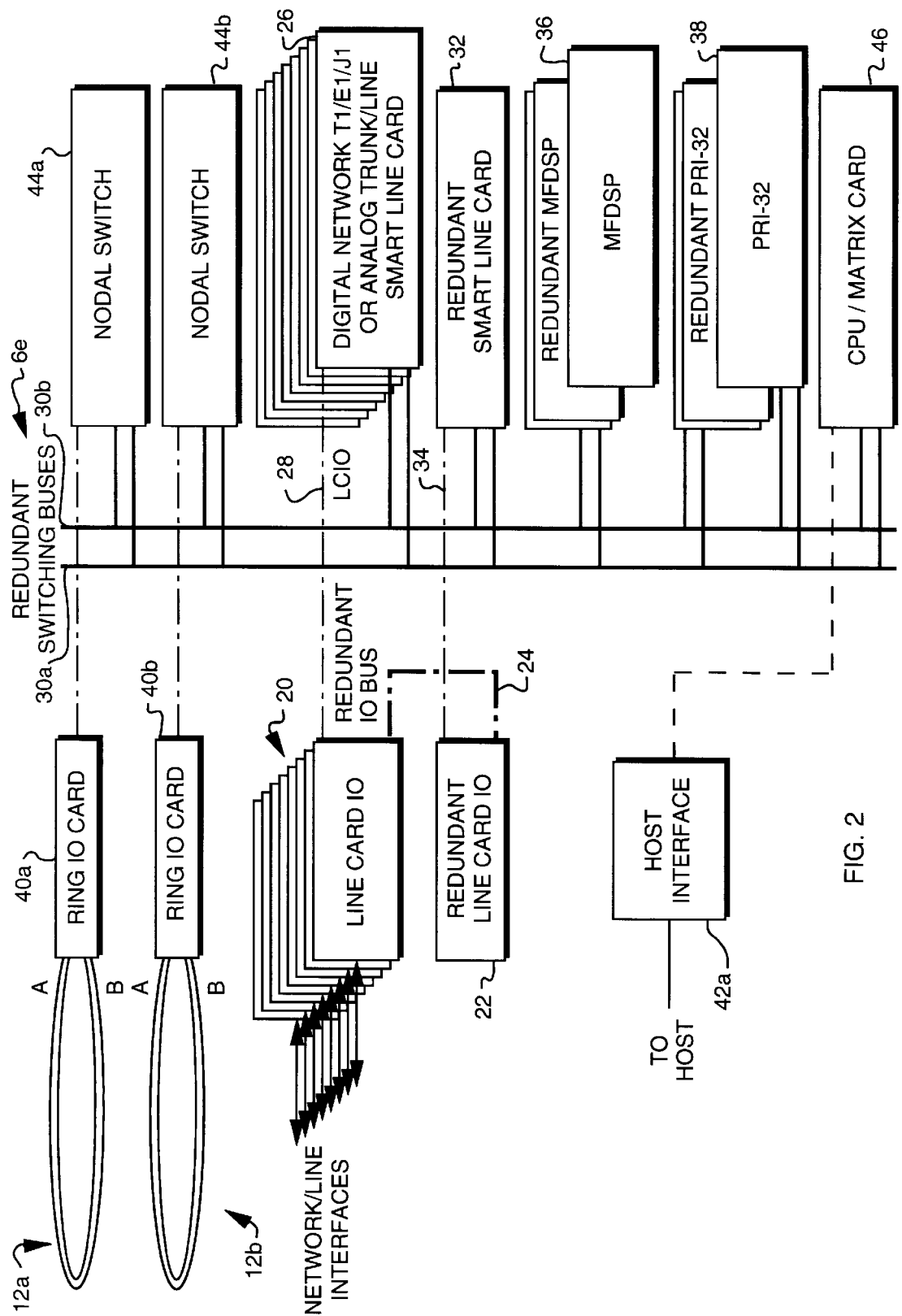
FIG. 2 is a block diagram of one type of programmable switching node which may be used in the system of FIG. 1.

FIG. 2 shows the major functional components of a preferred embodiment of one type of programmable switching node 6e which may be used in the system of FIG. 1. Digital or analog network/line interfaces are terminated on a series of line card input/output (IO) cards 20. In a preferred embodiment, network/line interfaces representing a total of 2,048 ports may be terminated by line card IO cards 20. If desired, a redundant line card IO card 22 and redundant IO bus 24 may optionally be provided to permit continued operation of the switching node in the event of a failure of one of line card IO cards 20.

A series of digital network T1, E1, J1 or analog trunk/line line cards 26 communicate with line card IO cards 20 over line card (LC) IO lines 28. Line cards 26 are also interfaced with redundant switching buses 30a and 30b. Again, if desired, an optional redundant line card 32 may be provided, which communicates with redundant line card IO card 22 over redundant LC IO lines 34. Other types of network/line interfaces such as DS3, SONET or others may also be provided.

Diverse communications services such tone detection and generation, conferencing, voice recorded announcements, call progress analysis, speech recognition, ADPCM compression and many others are provided by one or more multifunction digital signal processing (MFDSP) cards 36. ISDN Primary Rate service and other packet communications services are provided by one or more PRI-32 cards 38. Redundant MFDSP cards 36 and redundant PRI-32 cards 38 may be optionally included.

A ring (network) IO card 40a serves as an interface between inter-nodal network 12a and a nodal switch 44a. A second ring (network) IO card 40b serves as an interface between an optional, second inter-nodal network 12b and an optional, second nodal switch 44b, which is preferably of the same construction as nodal switch 44a.

A CPU/matrix card 46 is interfaced with switching buses 30a and 30b and with a host interface 42a. If desired, a redundant CPU/matrix card and host interface (not shown) may be included.

In terms of communicating with inter-nodal network 12a, node 6e has two basic operating modes. As shown by the solid line in FIG. 3A, during a normal mode of operation, packetized information is received from inter-nodal network 12a at port A of ring IO card 40a and passed through to nodal switch 44a. Information originating from nodal switch 44a is passed to ring IO card 40a and then transmitted via port B. Stated another way, during the normal mode of operation, information passing between nodal switch 44a and inter-nodal network 12a passes in one direction only through each of ports A and B.

Figure 3B:
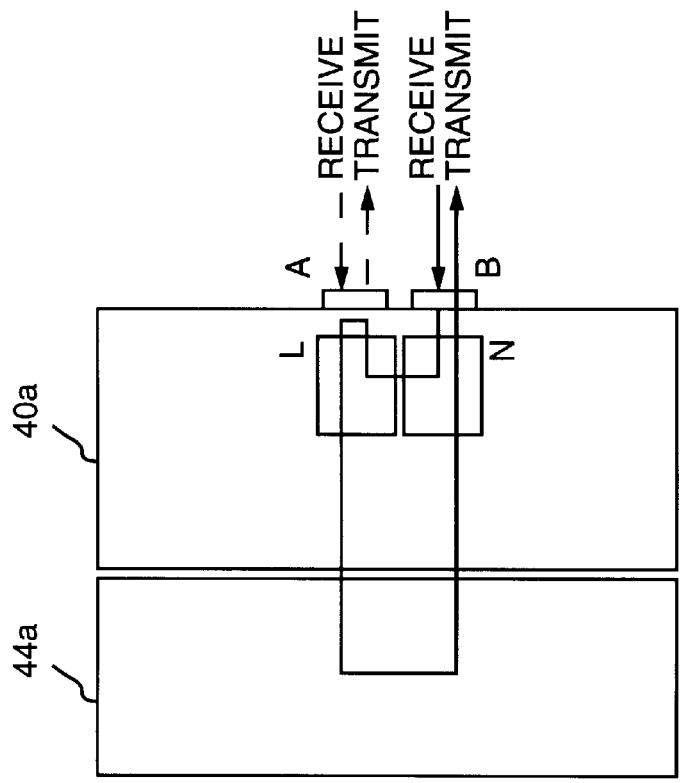
FIGS. 3A and 3B are block diagrams which illustrates a node's normal mode of operation and a loopback mode of operation.
Figure 3A:
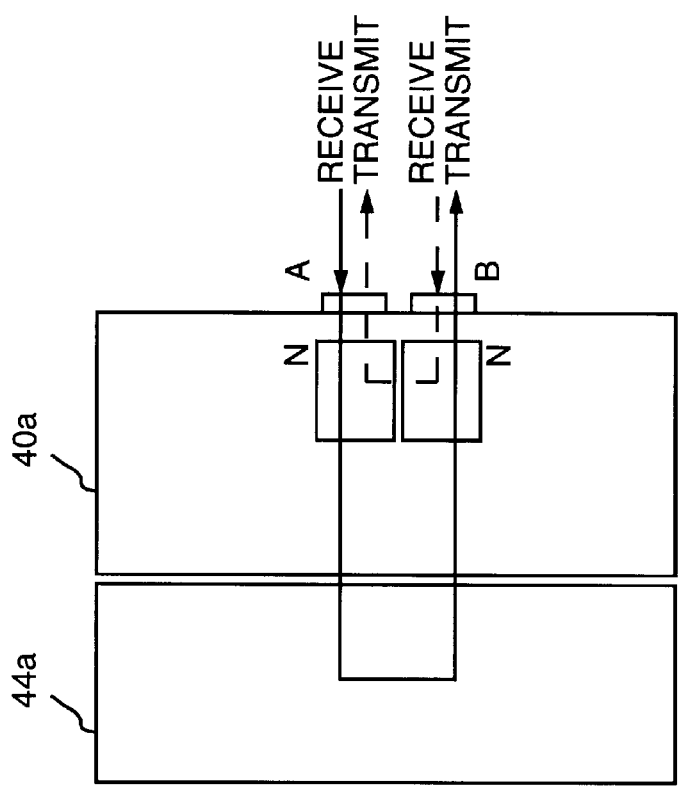

In contrast, as shown by the solid line in FIG. 3B, during a loopback mode of operation, port A is effectively disconnected from inter-nodal network 12a, while port B functions to both receive and transmit information. Thus, information is still passed through to nodal switch 44a. A particular ring IO card may operate in the loopback mode in response to a message from the host or detection of any of a number of fault conditions. The role of the loopback mode of operation in providing system redundancy and fault isolation is described in detail below.

Figure 4:
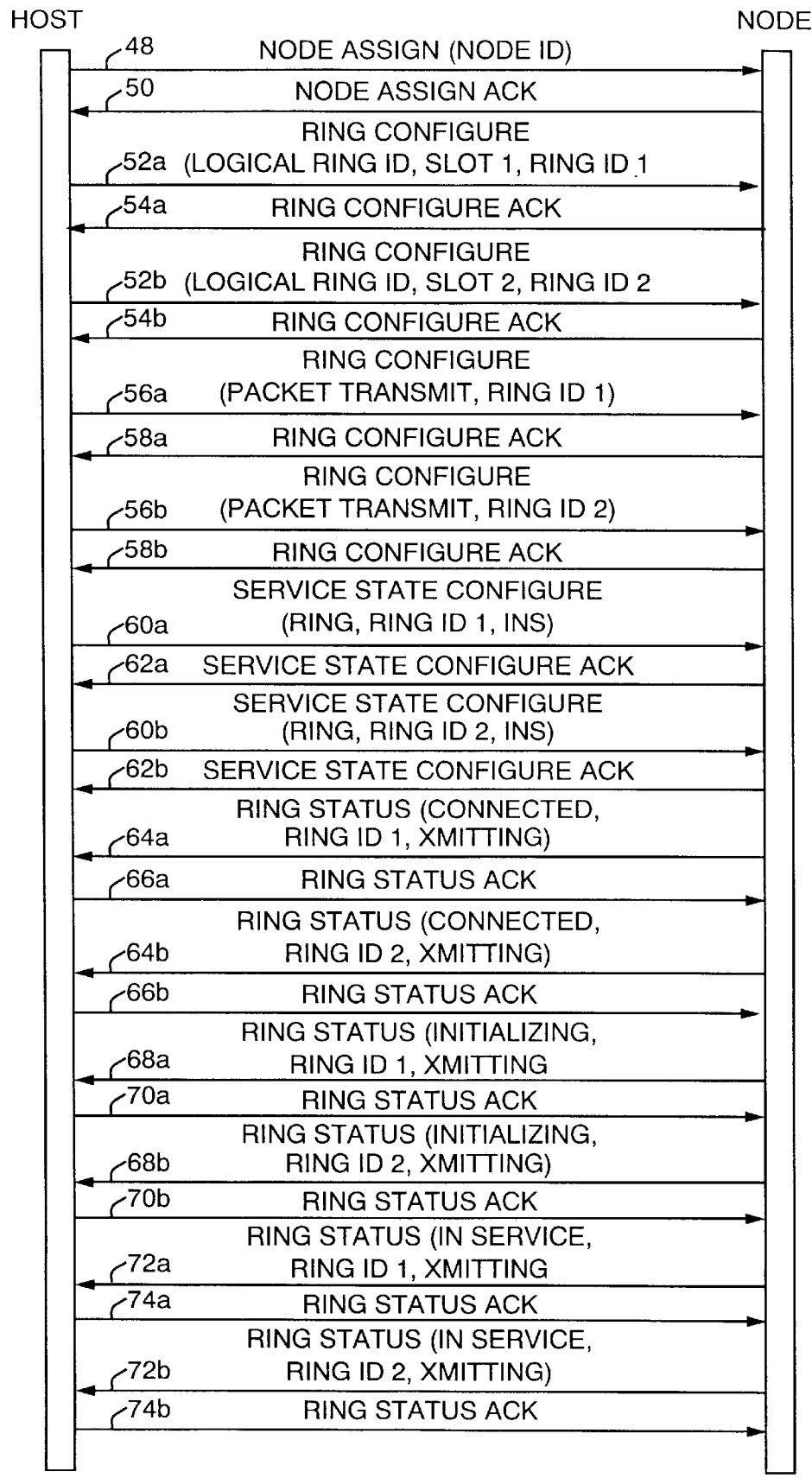
FIG. 4 is a message flow diagram which illustrates certain aspects of the process of configuring a node which may be used in the system of FIG. 1.

Referring now to FIG. 4, a process by which a node, such as node 6e (FIG. 2), containing two nodal switches (one of which is intended for redundancy) may be configured and brought into service is described. The host transmits a NODE ASSIGN message 48 to the node. NODE ASSIGN message 48 includes a logical node identifier (ID), a value assigned by the host which uniquely identifies a particular node within the entire system 2. Receipt of a NODE ASSIGN message 48 is confirmed by the return of a NODE ASSIGN ACKNOWLEDGMENT 50 to the host.

Subsequently, the host transmits a RING CONFIGURE message corresponding to each nodal switch which is to be attached to an inter-nodal network ring. Assume, for purposes of this example, that the node's two nodal switches are located in slots 1 and 2 within the node's chassis. Thus, two RING CONFIGURE messages 52a and 52b are sent the host. Each RING CONFIGURE message includes the previously assigned logical node ID, the chassis slot number of the nodal switch which is to be attached to the ring, and a logical ring ID, a value which uniquely identifies the particular ring to which the nodal switch is to be attached. The same logical ring ID must be assigned to every nodal switch in every node which is to be connected to that ring. Receipt of RING CONFIGURE messages 52a and 52b are confirmed, respectively, by RING CONFIGURE ACKNOWLEDGE 54a and 54b which are returned to the host.

Next, for each ring which serves a given node, the host transmits a RING CONFIGURE message 56 which designates either a transmit/receive operating mode or a receive only operating mode with respect to each such ring. In this example, RING CONFIGURE messages 56a and 56b instruct the node to operate in transmit/receive mode with respect to both rings. Receipt of messages 56a and 56b is confirmed by RING CONFIGURE ACKNOWLEDGE 58a and 58b, respectively.

The effect of messages 56a and 56b is that whatever information the node transmits will appear on both rings and is available to maintain inter-nodal connections in the event that one of the nodal switches fails. In other words, this node has been configured to support nodal switch redundancy.

Alternatively, one of the nodal switches could be configured in a receive only mode. In such a configuration, the node would not support nodal switch redundancy (i.e., a failure of the other nodal switch, which is operating in transmit/receive mode, would result in a loss of all inter-nodal connections across the node). However, the system which incorporates such a node would have greater overall switching capacity.

Through appropriate configuration, it is possible to decide on a node-by-node basis whether to allocate ring bandwidth to support nodal switch redundancy. It should be understood that a nodal switch's operating mode may subsequently be changed by the host, although changing from receive only mode to transmit/receive mode requires that the related ring be taken out of service temporarily.

All nodes which are configured to operate in the transmit/receive mode must participate in an arbitration to determine which node will be designated a master node and which nodes will be designated as non-master nodes. The same nodes must also arbitrate for source packets. Each node's source packets are uniquely identified (e.g., by a logical node identifier and a source packet identifier) with that node and are used to transmit information to or receive information from other nodes.

These arbitrations are carried out through a series of messages passed among the nodes over LAN/link 8 (FIG. 1) without involving the host. A given node (say, Node 1), if it is unaware that some other node has already achieved master node status, will broadcast a message to, in effect, claim master node status for itself as well as particular source packet values which are preferably chosen at random from a predetermined table of possible values. If no other node responds with a message indicating that master node status was previously assigned or that the chosen source packets values were previously assigned, then Node 1 becomes the master node and keeps the source packet values which it originally selected. Random selection is preferred to avoid a "collision" situation in which multiple nodes simultaneously, repeatedly attempt to claim the same source packet values.

Subsequently, as each other node, in turn, broadcasts a message claiming master node status and particular source packet values, the master node will transmit a reply message indicating a master node already exists. In addition, if a node randomly selected source packet values which were previously assigned to the master node or another non-master node, a reply message will be transmitted indicating same. In that circumstance, the node which is attempting to obtain source packet values will transmit another message with reselected source packet values, this process being repeated until a set of values which were not previously assigned is finally selected.

With reference again to FIG. 4, in order to bring a ring into service, the host transmits a SERVICE STATE CONFIGURE message 60. Receipt of messages 60a and 60b is confirmed, respectively, by SERVICE STATE CONFIGURE ACKNOWLEDGMENT 62a and 62b.

Subsequently, with respect to each ring to which the node is attached, the node transmits RING STATUS messages 64, 68, 72 to the host to report, in succession, that the ring is "Connected," "Initializing" and "In Service" along with the current operating mode of the ring. Receipt of each RING STATUS message is confirmed, respectively, by the host's transmission of RING STATUS ACKNOWLEDGMENT 66, 70, 74.

Figure 5:
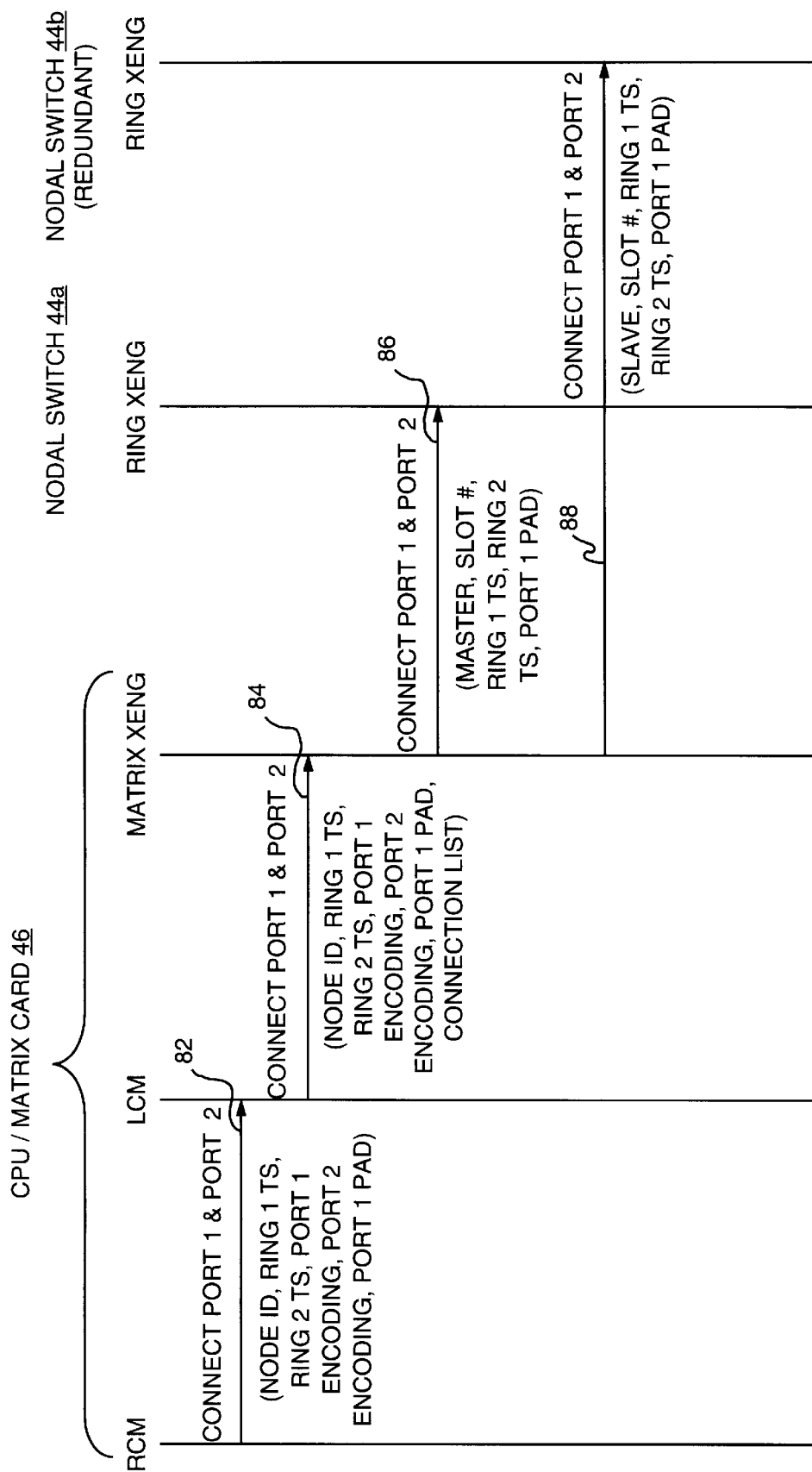
FIG. 5 is a message flow diagram which illustrates the set up an inter-nodal connection, with redundancy, using the node of FIG. 2.

FIG. 5 illustrates the process of setting up an inter-nodal connection (call), with redundancy, using a node like that shown in FIG. 2. A remote channel management (RCM) software component, which is running on CPU/matrix card 46, issues a CONNECT PORT 1+PORT 2 message 82 (i.e., an instruction to connect PORT 1 with PORT 2, one of which is physically associated with a different node) to a logical connection management (LCM) task. 20 Message 82 is accompanied by data which reflects the logical node ID of the remote node with which the connection is to be established, a timeslot on ring 1 (inter-nodal network 12a) which is to be used for the connection, a timeslot on ring 2 (inter-nodal network 12b) which is to provide redundancy for the connection, the type of encoding in use on PORT 1, the type of encoding in use on PORT 2, and a pad value applicable to PORT 1.

In response, the LCM process forwards a CONNECT PORT 1+PORT 2 message 84 to a matrix switching engine (MATRIX XENG) process. Message 84 is comparable to message 82, but also includes a "connection list" or information as to which hardware device should be instructed to make the connection and which ring timeslot to use. The MATRIX XENG, recognizing that a port associated with a remote node is involved in the connection, issues separate CONNECT messages 86 and 88 to nodal switch 44a and redundant nodal switch 44b, respectively.

Message 86 instructs nodal switch 44a to become the "master" with respect to this particular connection. The effect of message 86 is to cause nodal switch 44a, which will be receiving PCM information from the remote node over inter-nodal network 12a, to transmit such PCM information on switching buses 30a and 30b during a particular timeslot.

On the other hand, message 88, which is directed to redundant nodal switch 44b, serves to inform that switch of the connection which is being established, but also instruct that switch to become a "slave" (i.e., not to transmit information on buses 30a and 30b) with respect to the same timeslot. In this fashion, switch 44b acquires knowledge of the connection which is being established. Accordingly, in the event of a failure of nodal switch 44a, all that must be done to maintain the previously established connection is for the MATRIX XENG process to issue a message to switch 44b to become "master" of the timeslot, thereby causing switch 44b to beginning transmitting the PCM information it is receiving from the remote node onto buses 30a and 30b.

Figure 6:
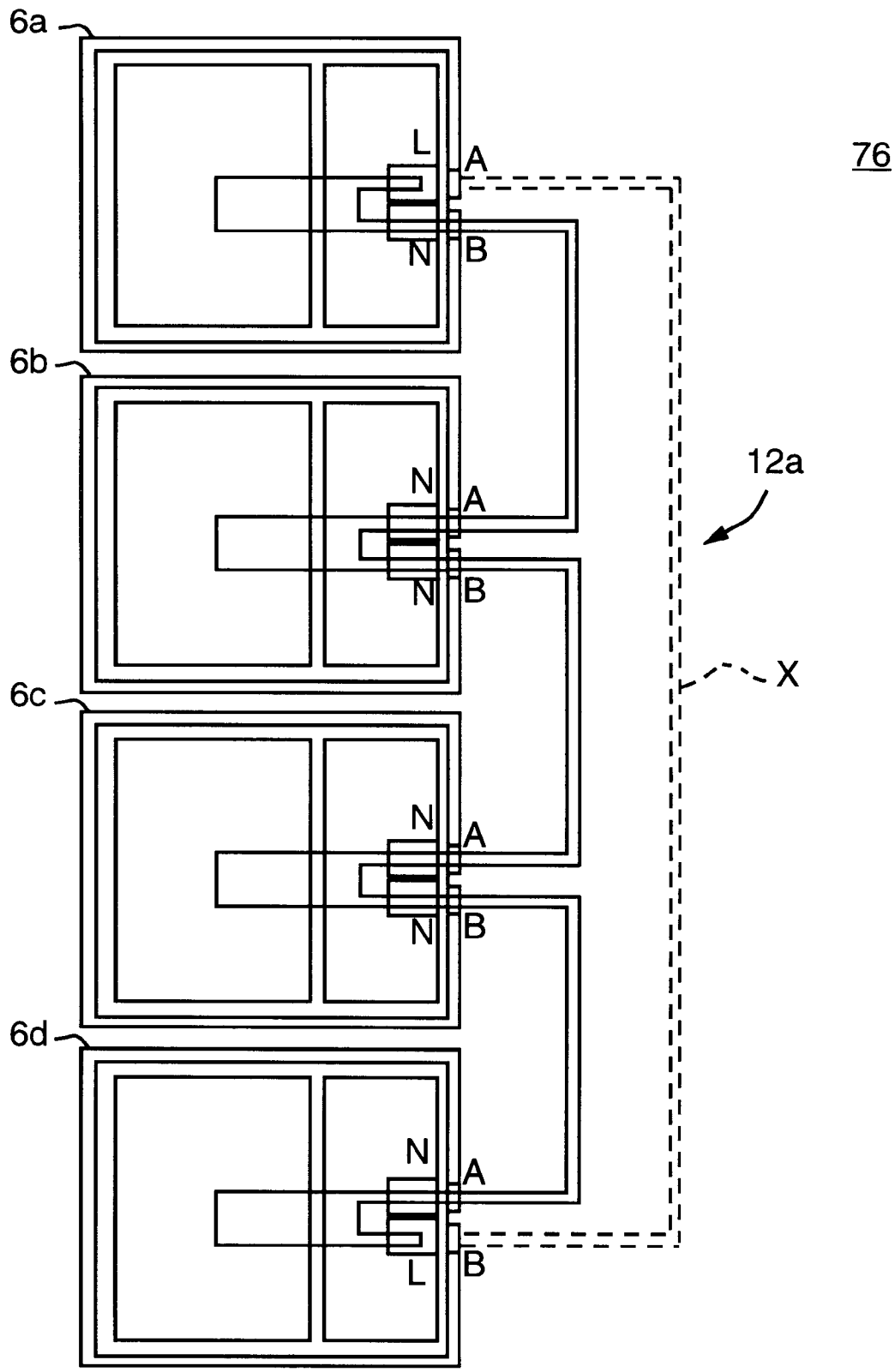
FIG. 6 is a block diagram which illustrates the communication paths and operating modes of a single ring system following a failure of one segment of the ring.

FIG. 6 illustrates an expandable telecommunications system 76 which is substantially identical to system 2 of FIG. 1 (the host, LAN and network/line interfaces omitted for clarity). However, as denoted by an X, a portion of inter-nodal network 12a has failed. Such a failure could be caused by a severing of the network, a detachment of the network from one of the nodes to which it was connected or any of a number of other conditions. In response, port A of node 6a and port B of node 6d have each invoked the loopback mode of operation, as denoted by the letter L. All of the remaining ports continue to operate in the normal mode of operation, as denoted by the letter N. As a result, the faulty portion of inter-nodal network 12a is effectively isolated, yet a complete communication path is maintained among all of nodes 6a–6d as indicated by the solid line.

Invocation of the loopback mode at a particular port may be controlled in at least two ways. As part of configuration, a nodal switch may be provided instructions of invoke the loopback mode in the event a failure is detected. Alternatively, upon detection of a failure, a node may send a message (e.g., a RING STATUS message) to the host reporting the failure and the host may return a message to invoke the loopback mode at the appropriate ports.

Figure 7:
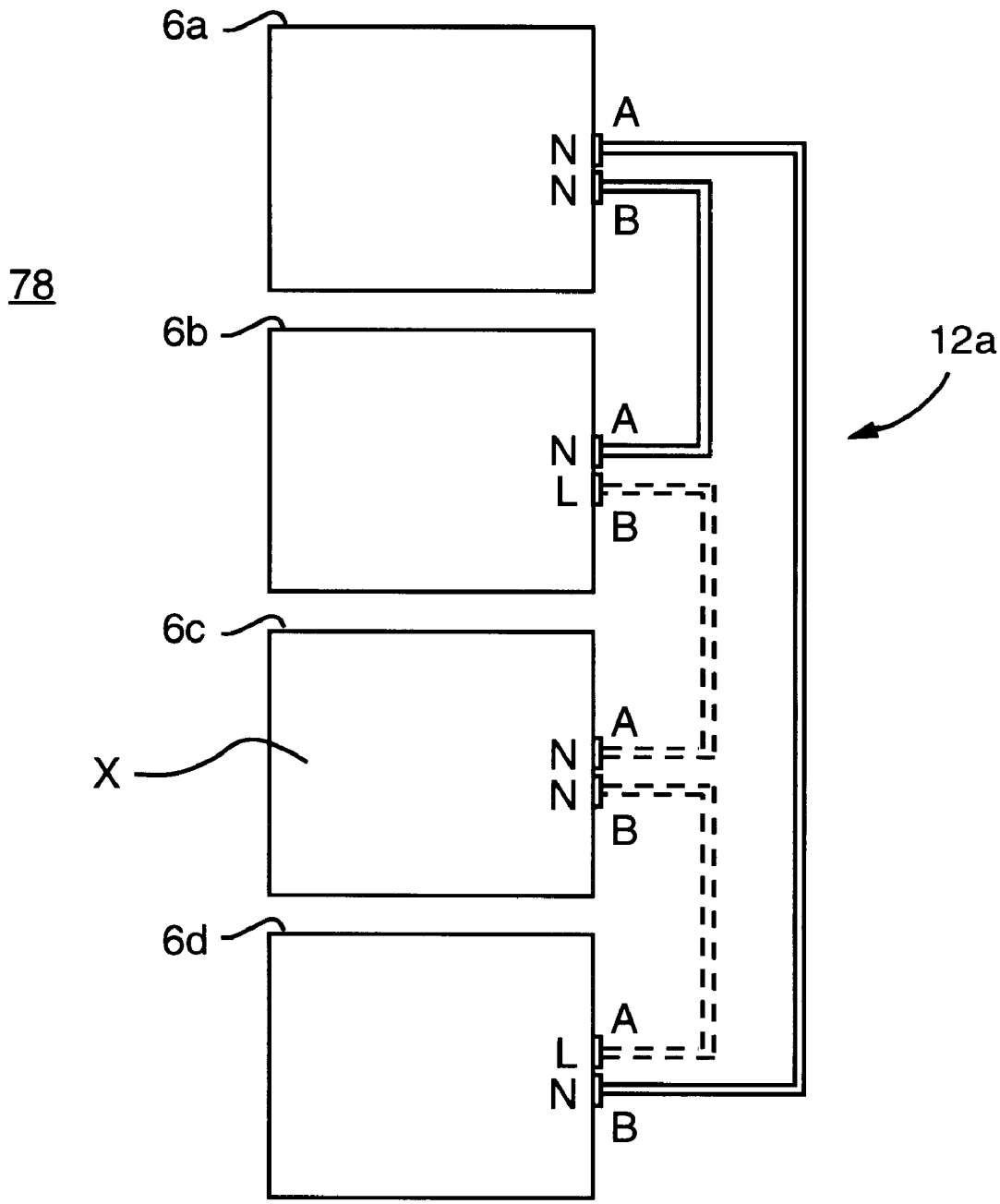
FIG. 7 is a block diagram which illustrates the communication paths and operating modes of a single ring system following a failure within a node.
Figure 8:
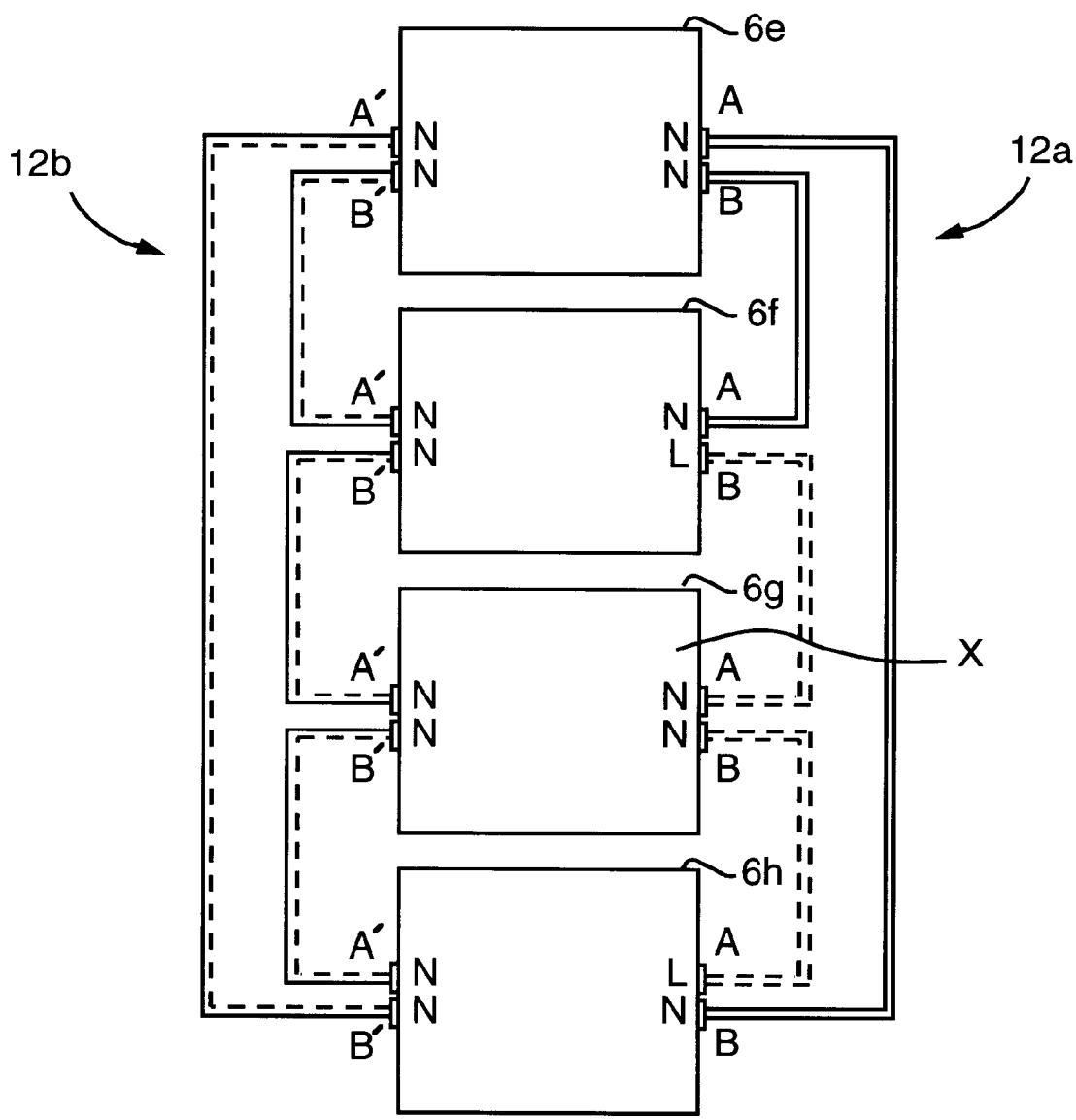
FIG. 8 is a block diagram which illustrates the communication paths and operating modes of a two ring system following a failure within a node.

FIG. 7 illustrates a system 78 in which a failure has occurred within node 6c. Such a failure may, for example, represent the failure of a nodal switch or ring IO card. In response, port B of node 6b and port A of node 6d have invoked the loopback mode of operation. As a result, node 6c is effectively isolated and out of service. Accordingly, calls cannot be connected across node 6c and calls which were previously connected are dropped. However, as to the remaining nodes 6a, 6b and 6d, a complete communication path still exists as denoted by the solid lines FIG. 8 shows a system 80 that includes four nodes 6e–6h, each of which includes two nodal switches as shown in FIG. 2, interconnected by two inter-nodal networks 12a and 12b. Assume that the nodal switches were configured as shown in FIG. 4 such that both switches transmit essentially identical information on both networks 12a and 12b. Subsequently, a failure has occurs in node 6g. As a result, port B of node 6f and port A of node 6h have invoked the loopback mode of operation. Thus, node 6g is effectively isolated from inter-nodal network 12a. However, by virtue of the presence of redundant inter-nodal network 12b and the redundant nodal switches present in each node, node 6g remains in service. Network 12b continues to carry all information among the nodes and all ports A' and B' continue to operate in normal mode. Calls which were connected across node 6g prior to the failure remain intact and new calls may be connected across that node in the normal fashion.

Inter-nodal network 12b provides the first level of redundancy for system 80. However, as discussed above, additional levels of redundancy may be provided by adding n additional inter-nodal networks across nodes 6e–6h, as well as a like number of nodal switches to each node. In such an arrangement, a total of n+1 levels of redundancy are effectively provided.

While the invention has been particularly shown and described with reference to preferred embodiments thereof, it will be understood by those skilled in the art that various changes in form and details may be made therein without departing from the spirit and scope of the invention. Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An expandable telecommunications system for carrying telecommunications traffic, said system having arrangements for redundancy, expanded switching capacity and fault isolation, said system comprising:

(A) a plurality of programmable switching nodes for performing telecommunications switching, each of said programmable switching nodes including a first and a second nodal switch, each nodal switch having first and second ports, and each port having a transmit and a receive coupling;

(B) a first inter-nodal network interconnecting said first nodal switches of said switching nodes, said first inter-nodal network including first and second optical fiber paths connected as rings for carrying packetized information in opposite directions among said first nodal switches, said first optical fiber path being connected to the receive coupling of the first port of each said nodal switch and to the transmit coupling of the second port of each said first nodal switch in such a manner that in a normal mode of operation, a first continuous communication path is established among said first nodal switches, said second optical fiber path being connected to the transmit coupling of the first port of each said first nodal switch and to the receive coupling of the second port of each said first nodal switch, thereby establishing a second, alternate path on said first inter-nodal network;

(C) a second inter-nodal network interconnecting said second nodal switches of said switching nodes, said second inter-nodal network including first and second optical fiber paths connected as rings for carrying packetized information in opposite directions among said second nodal switches, said second optical fiber path connected to the transmit coupling of the first port of said second nodal switch and with the receive coupling of the second port of said second nodal switch in such a manner that in a normal mode of operation, a first continuous communication path is established among said second nodal switches, and said second optical fiber path is connected to the receive coupling of the first port of said second nodal switch and with the transmit coupling of the second port of said second nodal switch, thereby establishing a second, alternate path on said second inter-nodal network; and (D) at least one host connected in communicating relationship with said programmable switching nodes and having means for selectably configuring the system, including means for instructing said first and second nodal switches to communicate in at least one of the following modes for at least a portion of the inter-nodal traffic:

a) a first mode in which the first and second optical fiber paths in at least one of the inter-nodal networks carry identical packetized information, thus supporting nodal switch redundancy;

b) a second mode in which said second inter-nodal network communicates packetized information that is identical with the information communicated on said first inter-nodal network, thus supporting overall system redundancy; and c) a third mode in which said second inter-nodal network communicates packetized information that is different from packetized information carried on said first inter-nodal network, whereby expanded switching capacity is provided.

2. The expandable telecommunications system of claim 1 wherein (A) each nodal switch also has a loopback mode of operation in which one port of said nodal switch is effectively disconnected from said inter-nodal network while the other of said ports functions to both receive and transmit packetized information using its transmit and receive couplings in such a manner that in said loopback mode of operation, a port of a nodal switch adjacent a fault in the system will be disconnected, and the remaining port of that switch continues a normal mode of operation and, additionally, will perform the function of the disconnected port using the second optical fiber path as an active communication path such that said packetized information continues to travel among the nodal switches; and (B) said host includes means for instructing the nodal switches in each of the two switching nodes adjacent to a fault to invoke loopback mode such that information continues to be transmitted through the system, but not through that portion of the system having the fault, whereby said system continues to operate except through the portion of the system including the fault.

3. The expandable telecommunications system of claim 2 wherein said means for selectably configuring the system includes means for transmitting a NODE ASSIGN message to a node to be configured, said NODE ASSIGN message including a logical identifier being a value assigned by said host which uniquely identifies that particular node.

4. The expandable telecommunications system of claim 1 wherein said means for selectably configuring the system further includes means for generating and transmitting a RING CONFIGURE message to each nodal switch, of said particular node, which is to be attached to a particular inter-nodal network in said system, said RING CONFIGURE message including:

(A) said logical identifier for that particular node;
(B) a physical location of said nodal switch in the system;
(C) an identification of said particular network to which the nodal switch is to be attached; and
(D) a designation of nodal switch operating mode with respect to said particular network, being selectable between transmit/receive operating mode, supporting nodal switch redundancy, and receive only operating mode, providing for expanded switching capacity.

5. The expandable telecommunications system of claim 4 wherein each nodal switch includes a time switch capable of switching a predetermined number of time slots.

6. The expandable telecommunications system of claim 5 wherein said means for configuring the system includes means for instructing a nodal switch to operate in transmit/receive mode for one portion of said time slots and to operate in receive only mode for a remaining portion of said time slots.

7. The expandable telecommunications system of claim 4 wherein said system is configured such that some nodes in the system are instructed to operate in transmit/receive mode as to both inter-nodal networks, and the remaining nodes in the system are instructed to operate in receive mode only as to the second network.

8. The expandable telecommunications system of claim 5 further comprising
   at least one additional pair of inter-nodal networks for carrying packetized information among said nodes in a predetermined direction; and
   each switching node in said system to be connected to said inter-nodal network contains an additional number of nodal switches such that each node contains one nodal switch to interface with each additional inter-nodal network.

9. The expandable telecommunications system of claim 8 wherein the system is configured on a node-by-node basis to support nodal switch redundancy, or expanded switching capacity.

10. The expandable telecommunications system of claim 3 further comprising
   said host includes means for identifying a fault in the system adjacent to one port of a nodal switch of a switching node, and means for generating a fault isolation signal upon identifying said fault.

11. The expandable telecommunications system of claim 3 wherein
   said host includes means for returning a message to all affected ports in a system to invoke loopback mode upon said host receiving a RING STATUS message from a switching node in the system that a failure has occurred and has been detected adjacent to that switching mode.

12. The expandable telecommunications system of claim 2 wherein each said switching node includes
   (A) a network IO card associated with each switch in said node, said network IO card being coupled between a nodal switch and that particular internodal network with which said nodal switch interfaces;
   (B) at least one switching bus in communicating relationship with each nodal switch in the switching node for carrying packetized information switched by said nodal switch on and off said particular inter-nodal network through said IO card;
   (C) a plurality of network/line interfaces associated with a public switched telephone network or a private network, coupled with a plurality of line card IO cards for transmitting and receiving information to and from outside communication lines,
   (D) packet-handling means coupled with said line card IO cards for processing and packetizing said information received from said network/line interfaces, and said packet-handling means being coupled with said switching bus in such a manner that packetized information is carried from said packet-handling means to said switching bus by said nodal switch on and off said inter-nodal network by way of said ring IO cards; and
   (E) host interface means associated with said host, and coupled with a CPU matrix card means, said CPU matrix card means having a connection to said switching bus for interfacing with and carrying message between said host and said node.

13. The expandable telecommunications system of claim 12 wherein
   said CPU matrix card means has means for setting up an internodal connection between its local node and a remote node, with redundancy, including
      (A) means for instructing one port in a nodal switch of said local node to connect with a selected port in said identified remote node;
      (B) means for assigning a timeslot on said first inter-nodal network which is to be used by said first nodal switch for the connection and an instruction to said nodal switch for that internodal network to be the master with respect to that particular connection;
      (C) means for assigning a timeslot on said second inter-nodal network which is to be used by said second, redundant nodal switch and an instruction to said second, redundant nodal switch to be the slave with respect to that particular connection; and
      (D) means for issuing a message to said second, redundant nodal switch to become master of said timeslot for the connection in the event of a failure of said first nodal switch.

14. Apparatus which is operable in a node in an expandable telecommunications system which system includes a plurality of nodes connected to one another by one or more inter-nodal networks, at least one of said nodes in said telecommunications system being connected in communicating relationship with a host, the apparatus comprising:
   (A) at least two nodal switches including a first and a second nodal switch, with said first nodal switch being connected in communicating relationship a first inter-nodal network in the system upon which information travels in a first direction, and said second nodal switch being connected in communicating relationship with a second inter-nodal network in the system upon which information travels in an opposite direction;
   (B) each said nodal switch having a first and second port, each port having a transmit coupling and a receive coupling, each said transmit coupling and receive coupling being coupled with an associated inter-nodal network in such a manner that information can pass from said node onto said associated inter-nodal network to another node on the network to which said information is addressed through said transmit coupling and information can pass from said associated inter-nodal network into said node through said receive coupling of said port; and
   (C) said first and second ports of each said nodal switch each having an open mode of operation in which information travels into the node on a first communications path via the receive coupling of the first port of the nodal switch and out of the node on said first communications path via the transmit coupling of the second port of said nodal switch onto an associated inter-nodal network, with the other coupling on each port being connected to an alternate communications path.

15. The apparatus of claim 14 wherein:
   each of said nodal switches is responsive to host-issued configuration messages to receive or transceive information on said first inter-nodal network that is substantially identical to that information that is carried on said second inter-nodal network, whereby redundancy is provided with respect to said first inter-nodal network, or to receive or transceive information on said first inter-nodal network that is substantially different from information that is carried on said second inter-nodal network, whereby expanded capacity is provided with respect to said system.

16. The apparatus of claim 14 wherein:
   said second inter-nodal network has a predetermined bandwidth and said nodal switches are configurable to use a first portion of said bandwidth for providing redundancy with respect to said first inter-nodal network, and a second portion is used to provide additional capacity with respect to said system.

17. The apparatus of claim 14 wherein:

each of said first and second nodal switches also has a loopback mode of operation in which one port of said nodal switch is looped back and thus is effectively disconnected from its inter-nodal network while the other port of said nodal switch functions to both receive and transmit information using its transmit and receive couplings and said alternate communications path.

18. The apparatus of claim 17 wherein:

each of said nodal switches is responsive to a host-issued loopback port message to invoke a loopback mode whereby that port is effectively disconnected from the system, but information continues to travel through the other non-looped back port of said node and onto the inter-nodal network with which it is associated.

19. The apparatus of claim 14 wherein:

each of said nodal switches transmits, in response to a first configuration message issued by said host which first configuration message assigns to the node in which said nodal switch is disposed, its own unique logical node identifier, a first configuration acknowledgment message and further said nodal switch recognizes said logical node identifier which has been assigned by said host in said first configuration message.

20. The apparatus of claim 14 wherein:

each of said nodal switches generates, in response to a second configuration message received from said host in which said host notified said nodal switch which inter-nodal network it will be coupled with, a second configuration acknowledgment message.

21. The apparatus of claim 20 further comprising:

each of said nodal switches establishes a communications mode in response to said second configuration message from said host, said communications mode being one of the following:
  (i) transmit-receive mode in which said nodal switch places its own information on to an associated inter-nodal network and receives information from said associated inter-nodal network; and
  (ii) receive only mode in which said nodal switch passes information along on said inter-nodal network from other nodes, but does not place its own information onto said network.

22. The apparatus of claim 14 wherein said apparatus is disposed in a non-switching node which includes means for providing voice processing or communications services.

23. A method of providing redundancy or expanding the capacity of a telecommunications system which system includes a plurality of nodes connected to one another by a first inter-nodal network each said node have at least a first nodal switch for passing information among said nodes in a first direction, with at least one of said nodes in said telecommunications system being connected in communicating relationship with a host, the method including the steps of:

(A) adding a second inter-nodal network to said system, and connecting all or some of said nodes to one another, and disposing a second nodal switch in each of the nodes connected to said second inter-nodal network such that information passes among the nodes connected to the second inter-nodal network in a second, opposite direction; and (B) configuring said system in accordance with one of the following:

(i) such that information carried on said second inter-nodal network is substantially identical to information carried on said first inter-nodal network whereby redundancy is provided with respect to said first inter-nodal network;
  (ii) such that information carried on said second inter-nodal network is substantially different from information carried on said first inter-nodal network, whereby expanded capacity is provided with respect to said system; or
  (iii) such that said second inter-nodal network has a predetermined bandwidth and said nodal switches are configurable such that a first portion of said bandwidth provides redundancy with respect to said first inter-nodal network, and a second portion provides additional capacity.

24. The method of claim 23 including further configuring the system including said host generating a first configuration message for each node in the system assigning each node a unique logical node identifier.

25. The method of claim 24 further including each node generating and sending to said host a first configuration acknowledgment message in response to said first host-issued configuration message assigning said logical node identifier.

26. The method of claim 25 further including configuring the system by said host sending a second configuration message addressed to each nodal switch including configuration information assigning the inter-nodal network to which each nodal switch in the node is to be connected.

27. The method of claim 26 further including each nodal switch generating and sending to said host a second configuration acknowledgment message in response to said second configuration message received from said host.

28. The method of claim 27 further including said host generating and issuing to each nodal switch a third message in order brining the associated inter-nodal network into service.

29. The method of claim 28 further including each said nodal switch generating and sending said host a third acknowledgement message in response to said third host-issued message.

30. The method of claim 29 further including establishing a telecommunications connection including the steps of:

(A) a nodal switch, in response to receipt of a call from an external source, issuing a fourth message identifying its port which is to be connected to a remote port in that or another node;

(B) sending with said fourth message, data including a logical node identifier of the remote node with which the connection is to be established, a time slot on the first inter-nodal network to be used for the connection, and a time slot on the second inter-nodal network to provide redundancy for the connection.

31. The method of claim 30 including the further step of:

sending with said fourth message information as to the nodal switch which will become the master node with respect to this connection and a fifth message to a redundant nodal switch that it will be a slave and will not transmit information onto the inter-nodal network for this connection.

32. The method of claim 25 including the further step of:

adding additional inter-nodal networks in pairs, with each programmable node containing one nodal switch per inter-nodal network.

33. The method of claim 32 including the further step of:

configuring the additional pairs of inter-nodal networks in accordance with one of the following:

(A) such that information carried on a first inter-nodal network in one of said pairs is substantially identical to information carried on a second one of said inter-nodal networks of that pair thereby providing redundancy with respect to said first inter-nodal network;

(B) such that information carried on a first inter-nodal network in one of said pairs is substantially different from information carried on a second one of said inter-nodal networks of that pair thereby providing expanded capacity with respect to said system; or (C) such that one of said inter-nodal networks in one of said pairs has a predetermined bandwidth and said nodal switches are configured to use a first portion of said bandwidth for providing redundancy with respect to said first inter-nodal network, and a second portion is sued to provide additional capacity.

34. A method of providing fault isolation in a telecommunication system, which system has a plurality of nodes interconnected by an inter-nodal network for passing information among said nodes, with each said node having at least one nodal switch having first and second ports, and each port having a transmit and a receive coupling, and each said node having a loopback mode of operation in which one port of said nodal switch is effectively disconnected from said inter-nodal network while the other of said ports functions to both receive and transmit information using its transmit and receive couplings in such a manner that a port adjacent a fault in the system will be disconnected, and the remaining port of that switch continues a normal mode of operation and, additionally will perform the function of the disconnected port such that information continues to travel among the nodes in the system, the method including the steps of:

in the presence of a fault in the system, a node adjacent said fault generating and sending a fault notification message addressed to said host informing the host that there is a fault adjacent to it in the system, and said host, in response to said fault notification message, sending a loopback port message to each node neighboring said fault, said loopback port message identifying the port that is adjacent to said fault and instructing each said adjacent node to place the identified port into loopback mode, such that said fault is isolated and information continues to travel through the remainder of the system.

\* \* \* \* \*